United States Patent [19]
Williams et al.

[11] 3,775,081
[45] Nov. 27, 1973

[54] METHOD OF MANUFACTURING GLASS

[75] Inventors: Harold Pritchard Williams; Martinus Hubertus Cornelis Gijbels, both of Emmasingel, Eindhoven, Netherlands

[73] Assignee: U.S. Philips Corporation, New York, N.Y.

[22] Filed: Sept. 29, 1971

[21] Appl. No.: 184,942

Related U.S. Application Data

[63] Continuation of Ser. No. 785,340, Dec. 9, 1968, abandoned.

[52] U.S. Cl. ............... 65/134, 65/136, 65/178, 65/346
[51] Int. Cl. ............................................. C03b 23/14
[58] Field of Search .................. 65/32, 134, 136; 63/134, 178, 346

[56] References Cited
UNITED STATES PATENTS

| | | | |
|---|---|---|---|
| 3,140,164 | 7/1964 | Long | 65/32 X |
| 3,251,667 | 5/1966 | Touvay | 65/182 X |
| 3,423,197 | 1/1969 | Loukes et al. | 65/32 X |
| 3,397,975 | 8/1968 | Irland | 65/182 |
| 3,127,261 | 3/1964 | Long | 65/182 X |

Primary Examiner—Frank W. Miga
Attorney—Frank R. Trifari

[57] ABSTRACT

A method of manufacturing glass in which water-vapor produced in a glass melt is reduced to hydrogen by a metal at the bottom of the melt which is unable to reduce oxidic components of the glass into metal or metalloid, e.g. tin, lead, antimony, or nickel.

3 Claims, 1 Drawing Figure

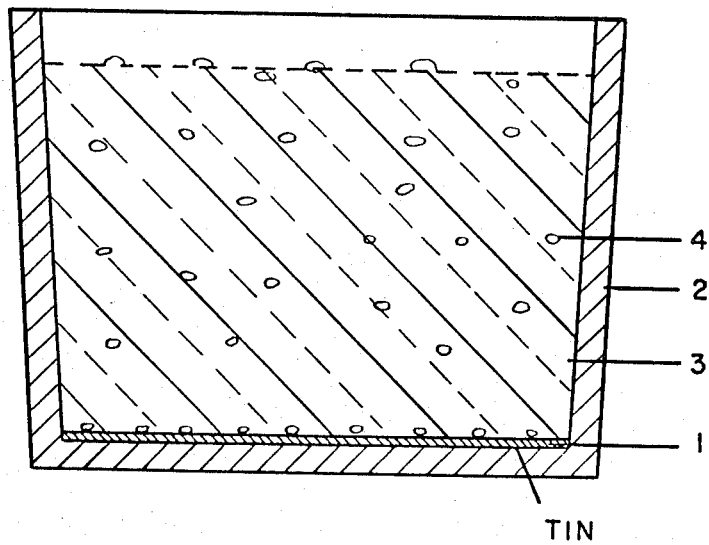
TIN

METHOD OF MANUFACTURING GLASS

This application is a continuation of application, Ser. No. 785,340 filed Dec. 19, 1968, now abandoned.

The invention relates to a method of manufacturing glass in a melting furnace.

For the manufacture of glass the starting material is a mixture of components of which react while forming glass. The mixture contans a few of the oxidic components as such and other components in the form of compounds which decompose into oxides during melting. They are principally carbonates, hydroxides, oxide hydrates, sulphates and nitrates which are used in a mixture and which, during melting, give rise to escape of carbon dioxide, water vapour, sulphur dioxide and nitrogen oxides. These gaseous products partly escape as large bubbles the escape of which usefully contributes to the homogenization of the melt. The speed of smaller bubbles towards the surface in the glass melt is lower and they may therefore be enclosed during cooling. A further part of the gaseous products may be dissolved in the glass melt and may be released as small bubbles during cooling of the melt when the relevant solubility decreases as the temperature decreases. Since these small bubbles can no longer escape from the melt upon increasing viscosity they are enclosed in the glass. Air bubble or gases which are given off by the porous refractory coating material of the furnace may also be enclosed. The enclosed gas bubbles are of course extremely undesirable.

This undesirable inclusion of gas bubbles is inhibited in a satisfactory manner by number of known so-called refining agents. The operation of these refining agents is based on a decrease of the solubility of the gaseous products in the melt, on a chemical reaction of the refining agent with the gaseous products in the melt or on facilitating the escape of gas bubbles by a refining agent which disappears from the melt in a gaseous condition and thereby causes strong agitation in the melt. One of the refining agents proposed years ago is pulverulent metal which is added to the mixture. This agent has, however, the drawback that its part which has not reacted is enclosed in the glass upon cooling.

The present invention provides a method of manufacturing glass in which refining takes place very effectively and the glass melt is homogenized more intensively than could be achieved up till now with the known refining agents, and in which in addition a few technological advantages of a completely different nature are present.

The invention is characterized in that a quantity of molten metal as a refining agent is provided in the presence of water vapour on the bottom of the furnace filled with the glass melt, said metal in the relevant glass melt being able to reduce water into hydrogen and being unable to reduce oxidic components of the glass into metal or metalloid.

In a gas-fired furnace water vapour is produced which diffuses through the glass and reacts with the molten metal lying on the bottom while forming hydrogen gas. This hydrogen initially dissolves in the molten metal, but after the metal is saturated with hydrogen the latter escapes in bubbles having a diameter of from 5 to 15 mms. These bubbles ensure an intensive refining and in addition a thorough homogenization.

It is not simply possible to carry out the preparation according to the invention in an electrical furnace, because there is not enough water vapour present during the stay of the melt in the furnace, even if the glass components in the mixture are used in a hydrated form as much as possible.

Additional advantages which are obtained when using the method according to the invention are a better temperature distribution in the glass melt and a smaller loss of heat through the bottom. In a continuous furnace a more advantageous flow of glass along the bottom is obtained.

The suitable metals are particularly tin, lead, and antimony. Nickel, which has a melting point of 1,450°C, is also suitable for glasses with a sufficiently high softening point if at least the green colour which is to be ascribed to the solution of the nickel ions produced during the reaction is no objection.

In the method according to the invention tin dioxide dissolves in borosilicate glasses in a quantity of less than 0.02 percent by weight and hence is eminently suitable for these types of glass.

It is to be noted that a method of manufacturing sheet glass is known in which a layer of glass is continuously supplied to the inlet of a bath containing molten metal which has a higher specific gravity than that of the glass, the glass on the metal surface of the bath being in a molten condition near the inlet and being continuously moved on the surface of said bath towards the outlet thereof, the temperature variation in and/or above the bath in the longitudinal direction of this bath being such that the glass strip, upon approaching the outlet, has sufficiently cooled to be removed from the surface of the bath in an undamaged condition.

It will be evident that the purpose of this known method is completely different and that its execution completely differs from the method according to the invention. Refining and homogenization do not take place because there is not enough water vapour.

The refining of a borosilicate glass of the following composition in percent by weight will now be described with reference to the accompanying drawing showing the refining of glass according to the invention and by way of example:

| $SiO_2$ | 64.7 | $K_2O$ | 2.8 |
| $B_2O_3$ | 23.3 | $Al_2O_3$ | 3.8 |
| $Na_2O$ | 5.4 | | |

A layer of molten tin 1 having a thickness of from 1 to 2 cms was provided on the bottom of the furnace 2 in which this glass 3 was melted. The mixture was heated in the furnace at 1,380°C for 5 hours, subsequently at 1,430°C for 3 hours, and finally at 1460°C for 2 hours. Subsequently, the glass was cooled to 1250°C at which most bubbles 4 were released and then rods were drawn from this glass at this temperature. The rods were exceptionally homogeneous which was most clearly visible in the longitudinal direction of the rod and they were free from enclosed gasbubbles.

We claim:

1. A method of manufacturing glass comprising the steps of:
    forming a glass melt composed of glass forming constituents and water vapor in a gas furnace;
    placing below the glass melt at the bottom of the furnace a quantity of molten metal as a reactive element, the molten metal reacting with water vapor which diffuses through the glass melt to the molten metal, the metal reducing the water vapor into hydrogen without reducing oxidic glass forming constituents of the melt to the corresponding metal; and allowing the hydrogen to escape through the glass melt to refine and homogenize the melt.

2. A method as claimed in claim 1 in which the molten metal refining agent is a metal selected from the group consisting of tin, lead, antimony, and nickel.

3. A method as described in claim 1 in which the glass metal consists of in weight percent 64.7 $SiO_2$, 23.3 $B_2O_3$, 5.4 $Na_2O$, 2.8 $K_2O$, and 3.8 $Al_2O_3$, and said molten metal refining agent is tin.

* * * * *